United States Patent [19]

Boecker et al.

[11] Patent Number: 4,932,166

[45] Date of Patent: * Jun. 12, 1990

[54] INERT AUTOGENOUS ATTRITION GRINDING

[75] Inventors: Wolfgang D. G. Boecker; Tadeusz Korzekwa, both of Lewiston; Lewis M. Koppel, Amherst, all of N.Y.

[73] Assignee: The Carborundum Company, Cleveland, Ohio

[*] Notice: The portion of the term of this patent subsequent to Oct. 4, 2005 has been disclaimed.

[21] Appl. No.: 252,751

[22] Filed: Oct. 3, 1988

Related U.S. Application Data

[63] Continuation-in-part of Ser. No. 868,954, May 30, 1986, Pat. No. 4,775,393, which is a continuation-in-part of Ser. No. 722,272, Apr. 11, 1985, Pat. No. 4,695,294.

[51] Int. Cl.$^5$ ............................................. B24D 3/00
[52] U.S. Cl. ...................................... 51/293; 51/307; 51/308; 51/309
[58] Field of Search .................. 51/293, 307, 308, 309

[56] References Cited

U.S. PATENT DOCUMENTS

| | | | |
|---|---|---|---|
| 3,075,710 | 1/1963 | Feld et al. | 241/16 |
| 3,231,203 | 1/1966 | Hardinge et al. | 241/24 |
| 3,268,177 | 8/1966 | McKibben | 51/163.2 |
| 3,311,310 | 3/1967 | Engels et al. | 241/153 |
| 3,485,608 | 12/1969 | Cecil | 51/308 |
| 3,521,825 | 7/1970 | Morcom | 241/26 |
| 3,715,083 | 2/1973 | Funk | 241/24 |
| 3,957,210 | 5/1976 | Durr | 241/46.02 |
| 4,123,286 | 10/1978 | Coppola et al. | 106/44 |
| 4,129,261 | 12/1978 | Engels et al. | 241/46.11 |
| 4,242,842 | 1/1981 | Yancey | 51/309 |
| 4,275,026 | 6/1981 | Hazel et al. | 264/67 |
| 4,544,376 | 10/1985 | Duran | 51/293 |
| 4,575,384 | 3/1986 | Licht et al. | 51/308 |

OTHER PUBLICATIONS

Bulletin 670 of the U.S. Dept. of Interior, "communication by the Attrition Grinding Process", Stanczyk et al., U.S. Govt. Printing Office 1981-332-076.

"Disintegration of Particulate Solids by Wet Grinding", H. Durr, 1978, Draiswerke Product Bulletin.

"Multi-Media Mills", Jaygo, Inc. Product Bulletin, date unknown.

"Perl Mill", Draiswerke Product Bulletin, date unknown.

"Drais Special-Purpose Process Machines", Draiswerke Product Bulletin, date unknown.

"Production of Submicron Silicon Carbide Powders by Attrition Milling", Stanley, et al., Reprint from Fine Particles–Second International Conference, Data Unknown.

S. Prochazka, General Electric Technical Information Series 86CRD158, Aug. 1986.

*Primary Examiner*—Paul Lieberman
*Assistant Examiner*—Willie J. Thompson
*Attorney, Agent, or Firm*—George W. Moxon II; Joseph G. Curatolo; Larry W. Evans

[57] ABSTRACT

A method for grinding an oxygen sensitive ceramic material to a powder which comprises grinding an oxygen sensitive ceramic feed material having an average particle size of between 1 and 200 microns in a contamination free high energy autogenous attrition mill in non-oxidizing fluid in the presence of media for a sufficient time to obtain a specific surface area of at least 5 $m^2/g$ and preferably at least 9 $m^2/g$. The media consists essentially of the same ceramic as the feed material is of high purity and has an average particle size of less than 4 mm and preferably less than 2.5 mm. the ground material may be further treated so that the average particle size is less than one micron and so that the greater than 97 numerical percent of the particles of the finished powder is smaller than 5 microns. The invention includes the finished powder.

51 Claims, 2 Drawing Sheets

FIG. IA

INERT AUTOGENOUS ATTRITION GRINDING

This application is a Continuation-in-Part of copending patent application Ser. No. 868,954, filed May 30, 1986, now U.S. Pat. No. incorporated herein by reference, which in turn is a Continuation-in-Part of patent application Ser. No. 722,272, filed Apr. 11, 1985, now U.S. Pat. No. 4,695,294.

BACKGROUND OF THE INVENTION

This invention relates to grinding methods and particularly relates to grinding of ceramic materials to ceramic powders. The invention especially relates to autogenous attrition grinding of such ceramic materials.

There has been a need for high temperature ceramic materials in powdered form wherein the particle size of the powder is very small, e.g., submicron. Such ceramic powders, for example, in submicron size, i.e., average particle size of less than one micron, are especially required for sintering operations wherein the powders are sintered into high temperature, high hardness ceramic articles. In the prior art, especially for materials having high hardness, e.g., in excess of nine on the Mohs scale, it was exceedingly difficult to obtain powders having particle sizes as small as desired. In order to obtain such powders, exceedingly long grinding times, often as long as days, were required. Furthermore, due to the hardness of the material, it was difficult to grind such materials without contamination, such as iron, resulting from the grinding media and container. It was proposed, for example, in U.S. Pat. No. 4,275,026, to grind ceramic materials such as titanium diboride in a mill having surfaces constructed of a non-contaminating material such as titanium diboride itself. When grinding media was used, it was usually a shaped media. The ground material had a broad particle size distribution with a large weight percent being in the larger particles. Surface areas indicate that the average particle size is usually not submicron even with long grinding times. An attrition mill is mentioned but there is no suggestion of high energy input in such a mill.

It has also been proposed, for example in U.S. Pat. No. 3,521,825, to actually introduce a second phase material in a milling process by including a milling media which provides the second phase material upon grinding in a milling jar. An attrition mill is not suggested for any purpose. This patent requires grinding media balls or pellets and involves slow milling processes. The milling time in the example in U.S. Pat. No. 3,521,825 is 72 hours.

Another method for avoiding contamination of product in such milling operations is by coating the walls of the container with an abrasion resistant material such as rubber or polyurethane which is satisfactory for slow grinding operations of the prior art.

It has further been proposed, for example in Bulletin 670 of the United States Department of the Interior, U.S. Government Printing Office No. 1981-332-076, entitled "Comminution By The Attrition Grinding Process" by Stanczyk et al, that ceramic materials can be ground using the material itself as the grinding media in a higher energy process. The process as disclosed in Stanczyk et al, however, has serious shortcomings. In particular, it is generally disclosed that a grinding media such as silica sand is desirable. Furthermore, the process and equipment disclosed is neither coated with an abrasion resistant material nor coated with the material being ground. In addition, the reference generally does not disclose grinding energy input which provides an agitator tip speed any greater than 7.22 meters per second. Such an energy input still is sometimes not as high as desirable to obtain rapid grinding of the material. Furthermore, especially in grinding devices which are coated with an abrasion resistant surface such as rubber or polyurethane, heat which is developed during the grinding process simply cannot be removed rapidly enough through the wall of the device to prevent steaming and build-up of pressure during a wet grinding operation at higher energy input. Such autogenous mills have not been suggested for use to reduce an oxygen sensitive feed material to a surface area of at least $5m^2/g$ nor to an average particle size below 1 micron. Additionally, it had been believed that such grinding resulted in rounded particles. Rounded particles of narrow size distribution are usually not considered desirable for sintering operations due to poor compaction properties.

Certain milled materials such as AlN, $TiB_2$, $Si_3N_4$ and sialons have been found to have characteristics unsuitable for sintering. The reasons for such unsuitability have not been entirely clear, but the presence of surface oxygen is believed by the inventors herein to be an important consideration which adversely affects sintering.

A paper by S. Prochazka dated August 1986 (General Electric Technical Information Series 86CRD158) discusses the milling of ceramic powders especially by attrition grinding. The paper discloses milling of various materials including mullite, alumina, silicon nitride, silicon carbide and boron carbide in various liquid media. There is, for example, a disclosure in Table 1 of the reference of silicon nitride milling in 2-propanol using zirconia media. There is no disclosure of milling silicon nitride to obtain a powder suitable for sintering and there is no suggestion that attrition milling of oxygen sensitive ceramics in an oxygen deficient environment would serve any useful purpose.

It is disclosed in copending patent application Ser. No. 722,272 that ceramic powders can be ground in a vibro-energy or vibratory mill, i.e., a vibrational mill having high frequency and special media. Frequency is often between 750 and 1800 cycles per minute. Such vibro-energy mill grinding, however, has serious disadvantages. In particular, high density packing of certain vibrationally ground ceramic materials is not obtained as easily as desired and vibratory grinding sometimes introduces impurities, especially boron and aluminum, which are undesirable for certain applications, especially electronics. Such impurities often result from sintering aids used in the manufacture of the grinding media. In addition, media of similar composition to the material being ground is difficult to manufacture and is expensive because submicron material must be blended with sintering aids, shaped and sintered. The use of sintering aids may introduce undesirable impurities as previously discussed.

BRIEF DESCRIPTION OF THE INVENTION

Figure 1:
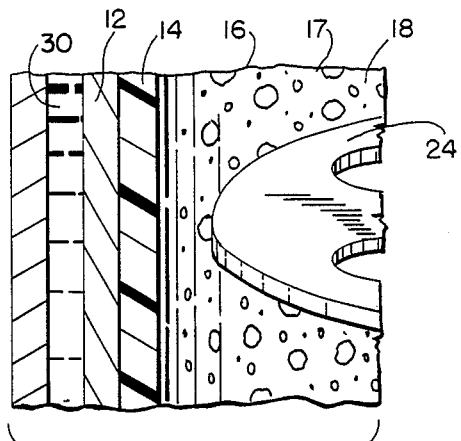
FIG. 1 shows an elevational, cross-sectional view of a first embodiment of an attrition mill.
Figure 1:
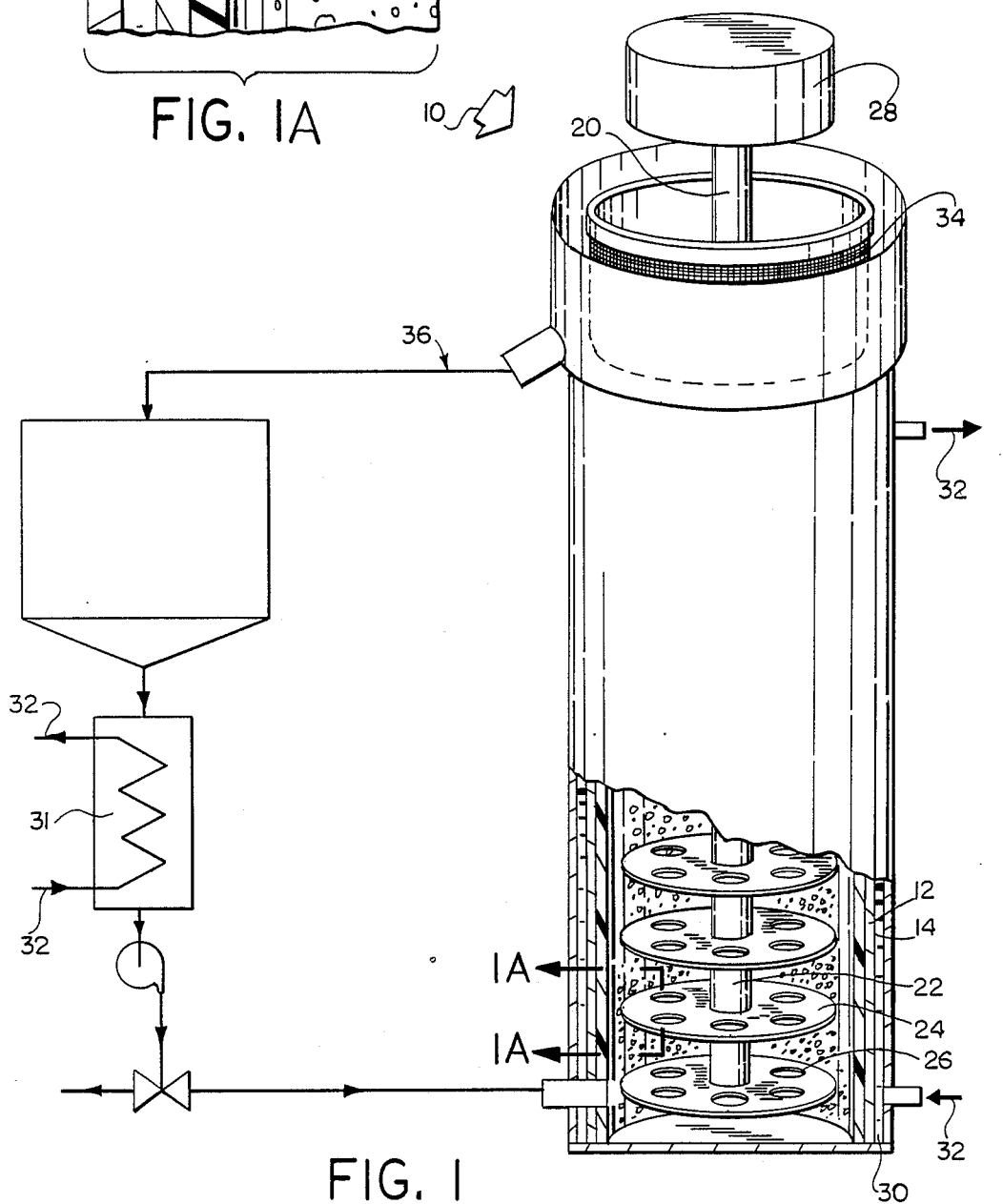

In accordance with the present invention, there is provided a method for grinding an oxygen sensitive ceramic feed material to a powder which comprises grinding the feed material having an average particle size of between 1 and 200 microns in a non-oxidizing fluid in a contamination free high energy autogenous attrition mill in the presence of media for a sufficient time to obtain a specific surface area of at least, 5 $m^2/g$ and preferably at least 9 $m^2/g$. The media consists essentially of the same material being ground, is readily available, is of high purity and has an average particle size of less than 4 mm and preferably less than 2.5 mm. The ground material may be further treated so that the average particle size is less than one micron and so that greater than 97 numerical percent of the particles of the finished powder is smaller than 5 microns.

The finished powder manufactured in accordance with the present invention, though difficult to physically describe with particularity, overcomes many serious disadvantages of prior art powders. In particular, certain submicron powders of the present invention compact better than certain prior art powders, i.e., achieve maximum compaction at much lower pressures than prior art powders and may be almost as pure as the starting feed powder, i.e., no impurities are added during the grinding method. In addition, it has been found that the powders of the present invention sinter better as a result of grinding in a non-oxidizing fluid. While not wishing to be bound by a particular theory, it is believed that the use of a non-oxidizing fluid reduces oxidation on the particle surfaces which interferes with sintering. Examples of materials which show improved sintering characteristics as a result of the method are AlN, $TiB_2$, $Si_3N_4$ and sialons. Other oxygen sensitive ceramic materials show improvement in sintering characteristics and reductions in surface oxygen. "Oxygen sensitive" is intended to include materials which are more oxygen sensitive than boron carbide under grinding conditions.

DETAILED DESCRIPTION OF THE INVENTION

In accordance with the present invention there is provided a process which overcomes many disadvantages of the prior art concerning grinding of oxygen sensitive ceramics such as $TiB_2$, AlN, $Si_3N_4$ and sialons, to powders having an average particle size of less than a micron. In particular, grinding times are generally shorter than those of the prior art due to the capability of putting higher shear energy into the system. This is possible because heat transfer from the system is substantially improved in accordance with the present process. Furthermore, no special grinding media are required and in general the material itself may act as the grinding media producing ultra fine powders directly. The grinding media consists essentially of the same material as the feed material, preferably has an average size of less than 2.5 mm and may simply be crushed high purity ceramic without formation into particular shapes. The media may in fact be the powder which is being ground. The media can be obtained simply by crushing larger pieces of the ceramic material being ground. The media is therefore often less than 5% of the cost of sintered media such as may be used in vibro-energy mills. As a result of shortened grinding times and the elimination of the requirement of special grinding media, cost of grinding is substantially reduced. In addition, contamination by grinding media and grinding container surfaces is essentially eliminated. The resulting powders may therefore be of very high purity, i.e., almost as pure as the starting material. Furthermore, submicron powders made in accordance with the present invention, while difficult to describe with particularity, unexpectedly often compact much easier than prior art submicron powders.

Non-oxidizing fluids, commonly used in accordance with the present invention to suspend the material being ground, are for example hydrocarbons, such as aromatic liquids, e.g., toluene and aliphatic liquids, e.g., hexane and heptane. The fluid may be a mixture of non-oxidizing fluids such as an aliphatic liquid and a gas selected from inert gases, hydrogen and nitrogen. The fluid may be a liquefied gas such as liquid propane, butane, hydrogen, nitrogen, neon, helium, and argon. Hydrogen chloride may be used since it is generally not considered to be oxidizing as can carbon monoxide. These later gases may not be preferred because of toxicity considerations and handling difficulty. The grinding may be done at low temperatures, i.e., cryogenically which in some cases improves ease of fracture and yields sometimes desirable particle shapes. Cryogenic grinding, in fact, has certain advantages with respect to fracture characteristics whether or not the ceramic is oxygen sensitive.

To prevent abrasion, the agitator is usually coated with rubber or polyurethane in accordance with the present invention. Alternatively, the agitator may be manufactured from a material having the same composition as the ceramic being ground.

In general, in accordance with the present invention the ceramic material, prior to autogenous grinding in accordance with the present invention, is a particulate material having an average particle size of between one and 200 microns and preferably between one and 100 microns. In general, the ceramic material after autogenous grinding has an average particle size of less than a micron.

The peripheral speed of the agitator in accordance with the present invention is usually fairly high and may be above 7.5 meters per second and may commonly be from about 10 to about 100 meters per second. At these peripheral speeds, i.e., high energy input, the grinding operation is usually between 2 and 12 hours residence time but is usually less than about ten hours even when relatively large initial particle sizes of material to be ground are used.

Desirably, the ratio of the inside diameter of the grinding container to the inside length of the grinding container is from about 1:1 to 1:10 and the walls of the container may be fluid cooled, e.g., by water, to further enhance heat transfer. A ceramic grinding chamber having good heat transfer may be used to enhance heat transfer. Furthermore, an external heat exchanger may be used. The agitators are desirably discs assembled on a drive shaft oriented in any desirable position, e.g., such that the central axis of the container is proximate the center of the disc or off center to increase turbulence. The discs desirably are provided with holes which increase the effect of the agitation.

FIG. 1 shows a cross-sectional view of a first embodiment of a grinding mill for use in accordance with the autogenous attrition grinding method in accordance with the present invention, a mill 10 is provided with a cylindrical grinding container 12 comprising sidewalls 14 coated with an abrasive resistant material such as polyurethane or natural or synthetic rubber. Mill 10 contains high purity ceramic media 16 of a grit size of number 8 or number 10 or smaller. Oxygen sensitive ceramic feed material 17 in general having a particle size of between 1 and 100 microns, is also present in mill 10. Feed material 17 is suspended in a non-oxidizing liquid 18. Mill 10 is provided with an agitator 20 which comprises a drive shaft 22 to which are secured discs 24. Discs 24 generally contain holes 26 therethrough to increase the effect of the agitation. A drive means 28, usually in the form of an electric motor, is provided to turn drive shaft 22. In general, drive means 28 provides sufficient power and speed to turn drive shaft 22 at a speed which permits a peripheral speed of the agitator in the range of from about 10 to about 100 meters per second. Container 12 is generally of a cylindrical shape. Sidewalls 14 of container 12 are generally provided with a cooling jacket 30 through which cooling water 32 passes to remove heat resulting from the grinding operation or alternatively an external heat exchanger 31 is provided to cool the suspension (slurry) by pumping the slurry through exchanger 31. The top of container or chamber 12 is provided with a screen 34 which retains media in mill 10 and allows slurry containing ground fine powder 36 to leave the mill on a continuous basis. The screen size is anywhere from five to 100 microns depending upon the product requirements. Drive shaft 22 and attached discs 24 may or may not be made of the same material as is being ground but are usually coated with an abrasion resistant material such as rubber or polyurethane. When the apparatus is used in conjunction with a flammable liquid such as heptane, all motors and electrical equipment are explosion resistant and the apparatus is used in a controlled environment.

Figure 2A:
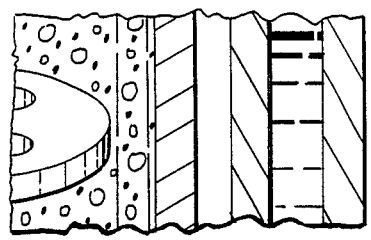
FIG. 2 shows an elevational, cross-sectional view of a preferred embodiment of an attrition mill for use in inert grinding in accordance with the invention.
Figure 2:
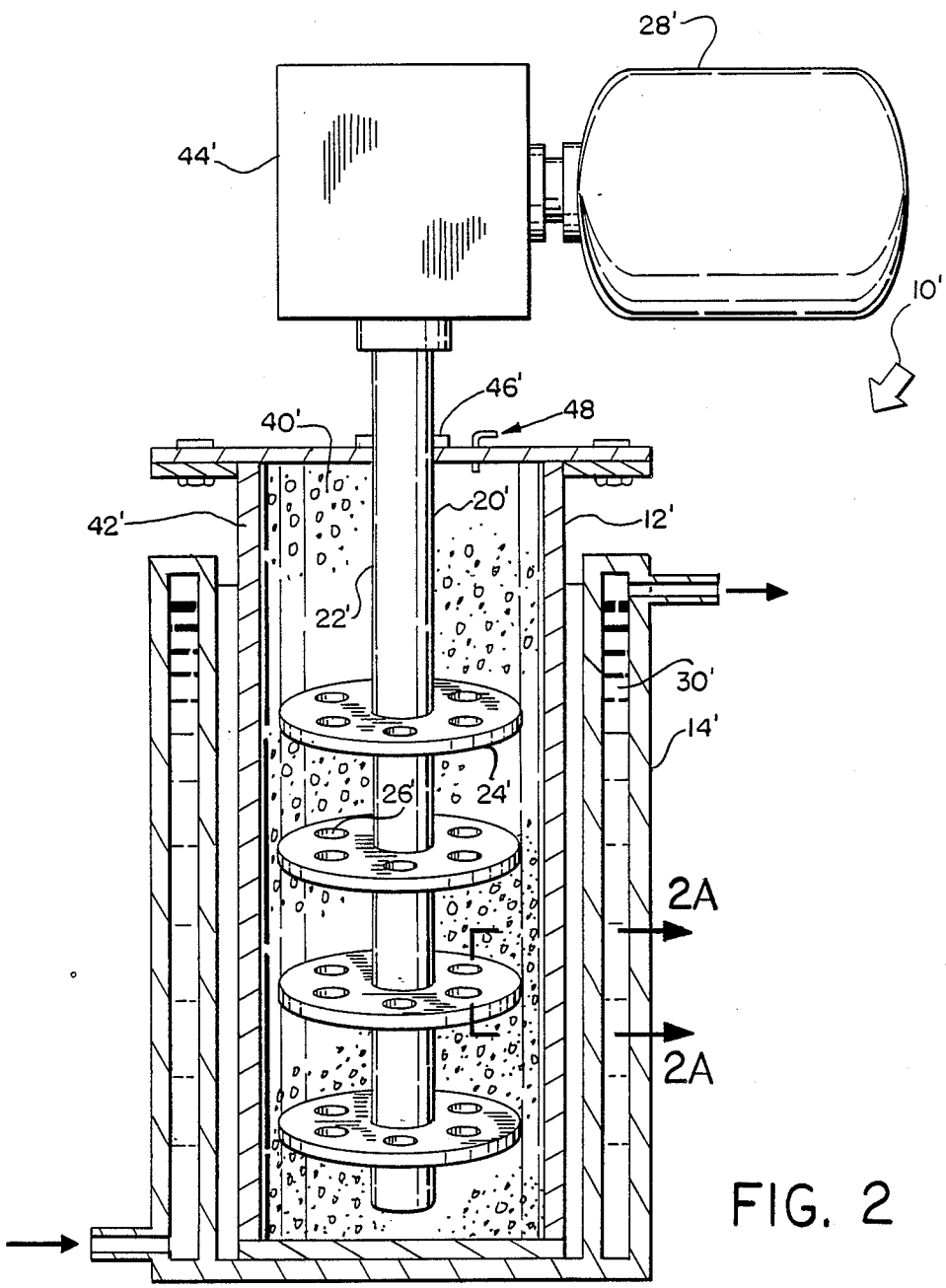

FIG. 2 shows an alternative and preferred embodiment of an autogenous grinding mill for use in accordance with the present invention.

The mill 10' is provided with a cylindrical grinding container 12' comprising sidewalls 14' forming a jacket 30' through which a cooling liquid such as water may be passed. A grinding chamber 40' is defined by ceramic insert 42' placed within the sidewalls. Mill 10' is provided with a polyurethane coated agitator 20' which comprises a drive shaft 22' to which are received disks 24'. Disks 24' generally contain holes 26' therethrough to increase the effect of the agitation. A drive means 28' is provided in the form of an explosion proof motor which is connected to shaft 22' through a speed reducer and clutch 44' and an airtight seal 46'. Desirably, for safety when a flammable liquid is used, such as heptane, the attrition mill is operated in a ventilated fume hood (not shown) with explosion proof switches. The chamber 40' is desirably purged with a non-reactive gas such as argon or nitrogen through a purge opening 48'.

It has been found that subsequent to grinding in the autogenous mill the powder still contains a significant quantity, i.e., usually between 4 and 10 percent, of particles larger than 5 microns usually resulting from media wear. Even extended grinding times often do not completely eliminate these large particles.

In accordance with the present invention it has been found that these larger particles may interfere with sintering operations and in accordance with the invention must be significantly reduced or eliminated by further treatment. Such further treatment results in a powder wherein greater than 97, and preferably greater than 98.5, numerical percent of the particles is smaller than 5 microns. In addition, after such further treatment the finished powder desirably has an average particle size of 0.5 to 0.9 microns.

Such further treatment may include elimination by selectively grinding the larger particles to a smaller size by a suitable different milling operation, such as vibratory grinding as described in copending patent application Ser. No. 722,272, filed Apr. 11, 1985. In accordance with the present invention, such grinding also occurs in a non-oxidizing fluid. In such a grinding method, the powder is vibrated with sintered pellets of as close to the same composition as the powder as is practical. The pellets usually have a maximum dimension of from about 0.5 to 5 centimeters and the diameter of the cylinder is from 0.3 to 4 times the length of the cylinder.

The larger particles may also be eliminated, for example, by separation by sedimentation or centrifuging techniques known to those skilled in the art.

The resulting submicron powder has unexpected and useful properties, especially in sintering operations. The powder may be of higher purity than prior art powders, e.g., may contain less than 800 ppm total metal impurity, less than 100 ppm aluminum and less than 10 ppm boron, since there is little or no contamination from the grinding and milling operation as commonly occurred with prior art methods.

In particular, metal media is not used, thus iron impurities are not introduced. In the first grinding step, sintered media is not used, thus aluminum or boron impurities, which are commonly used as sintering aids to fabricate the grinding media, are not introduced. Furthermore, even when vibratory grinding with sintered media is used as a finishing step, little contamination is introduced when compared with powder obtained completely by such vibratory grinding. This is true because the finishing step to eliminate particles having a size of over .5 microns takes only about 2 to 8 hours; whereas, completely forming the submicron powder by vibratory grinding usually takes more than 30 hours, typically 36 to 48 hours.

Powder ground in accordance with the present invention has a low oxygen content even though surface area is substantially increased. The oxygen content is desirably below 6, preferably below 5 and most preferably below 3 weight percent of the powder at a surface area of 9 m$^2$/g.

Furthermore, the attrition ground powder often unexpectedly compacts to a high density more easily than prior art powders. This is desirable to more easily obtain high density sintered products with less shrinkage during sintering.

The property of superior compaction is especially unexpected because the prior art considered autogenously ground material to become rounded and rounded material having a narrow size distribution is known not to pack tightly. It is believed that, while not wishing to be bound by any particular theory, submicron powder which is at least 90% formed by autogenous attrition grinding, has a shape and size distribution which is desirable for high compacting densities.

The following example serves to illustrate and not limit the present invention.

EXAMPLE

Various oxygen sensitive ceramic materials and controls were ground in an attrition mill in an inert environment.

The mill used to grind the materials was essentially as shown in FIG. 2.

The ceramic insert used as the grinding chamber was made of silicon carbide and was firmly positioned inside the walls which were made of stainless steel. The space between the insert and the stainless steel walls was filled with heptane. During grinding operations the silicon carbide evidenced excellent heat conductivity and minimal wear despite the rather sharp and coarse grain of the grinding media which is often encountered.

The initial mill charge consisted of about 27% feed material solids by weight of heptane dispersing liquid. 1.5 to 2 kg of coarse grain was added as grinding media which was usually in the 10 to 40 mesh range. The total slurry volume was kept at about 2.2 liters. The grinding was effected by disks mounted on a shaft rotating at 1200 rpm as shown in FIG. 2. A temperature limit of 50° C. was imposed for safety, for minimizing the polyurethane coated wear of the disks and for easier control of slurry density. During grinding samples were drawn periodically for analyses and a total grinding time tested for grinding to required to grind to submicron size was 4 to 20 hours Each slurry sample was screened through 500 mesh to separate the grinding media and the product. The powder was settled and excess of heptane was decanted. Drying was in a distillation type of apparatus (Buechi's Rotavapor) in the atmosphere of heptane vapor and under vacuum (about 25 inches of Mercury) using a water bath temperature of 80°–90° C. When the drying was completed, the system was flushed with argon, the sample transferred into a glove box also purged with argon and distributed into smaller bottles for analyses (specific surface area, particle size and oxygen analyses).

Specifications for the grinding operation are given in Table I and grinding results are given in Table II.

TABLE I

| MILL DATA | | |
|---|---|---|
| Motor | 440/480 V, 1.3 HP | |
| Variable Speed Gear Box Output | 400 to 1500 rpm (mill shaft speed) | |
| Grinding Chamber | Material: SiC (Mill insert) Capacity: 4.1 liters Media Capacity: 1.5 to 3 kg depending on specific gravity Ratio of length to inside diameter - 1.89 Shaft with polyurethane coated metal disks and spacers between Disk Diameter 126 mm, Tip Speed (@ 1200 rpm - 7.9 m/sec) Operating Speed 1200 rpm (in these examples) | |
| OPERATING CONDITIONS | | |
| | Operating Range | Controlled by |
| Type of Operation | Batch | |
| Slurry Temperature | 29–44° C. | (a) Mill's Water Cooling Jacket (b) Heat transfer through heptane filling the space between chambers |
| Slurry % solids feed material by weight | 27 minimum | Evaporation of heptane (temp., grindability of powder (or media) Heptane additions |
| Electrical Current | 2.5–3.0 Amps | Mill loading - Shape and size of grinding media |
| Grinding Time | 4–20 hrs. | Grindability of powder (& media) |
| Batch Size | 337 g 2.2 liters | of powder of slurry |
| Slurry recirculation | None | Mixing within the mill enhanced by the holes in the disks |
| Grinding Media Addition | None | |
| Feed Particle Size | 1–75 um | |
| Grinding Media Size | | Mostly 10 to 20 mesh except AlN Mostly 20 to 40 mesh |

TABLE II

TABLE OF GRINDING RESULTS

| CERAMIC MATERIAL | GRINDING FLUID | GRINDING TIME, HRS. | AV. PARTICLE SIZE, μm | SPEC. SURFACE AREA m²/g | OXYGEN wt. % | CARBON wt. % |
|---|---|---|---|---|---|---|
| SiC | Water | 0 | 2.8 | 2.1 | 0.2 | |
| | | 4 | 0.58 | | | |
| | | 8 | 0.56 | | | |
| | | 12 | 0.60 | | | |
| | | 16 | 0.58 | | | |
| | | 20 | 0.55 | 37.7 | | |
| AlN | Heptane | 0 | 2.66 | 1.5 | 1.6 | |
| | | 1 | 0.88 | 6.3 | 2.8 | 1.29 |
| | | 4 | 0.66 | 14.1 | 3.9 | 1.69 |
| | | 8 | 0.68 | 14.7 | 4.6 | 1.75 |
| | | 16 | 0.51 | 17.8 | 5.0 | 1.81 |
| | | 20 | 0.49 | 19.8 | 5.3 | 1.86 |
| B₄C | Heptane | 0 | 15.7 | 0.02 | 2.0 | |
| | | 4 | 1.46 | 5.3 | 2.9 | |
| | | 8 | 1.12 | 6.8 | 2.8 | |
| | | 12 | 0.88 | 9.9 | 3.0 | |
| Powder From Media Alone | | 2 | 1.62 | 3.5 | | |
| Si₃N₄ | Heptane | 0 | <44 | <1.0 | 1.7 | 0.60 |
| | | 4 | 1.22 | 8.3 | 2.0 | |
| | | 8 | 1.24 | 8.3 | 2.0 | |
| | | 12 | 1.10 | | 2.1 | |
| Powder From Media Alone | | 2 | 0.97 | 7.6 | 2.3 | |
| TiB₂ | Heptane | 0 | <44 | 0.6–0.8 | 0.2 | 0.57 |
| | | 2 | 1.55 | 2.4 | 3.0 | |
| | | 5 | 1.01 | 7.0 | 3.4 | |
| | | 8 | 0.86 | 7.6 | 3.6 | |

TABLE II-continued
TABLE OF GRINDING RESULTS

| CERAMIC MATERIAL | GRINDING FLUID | GRINDING TIME, HRS. | AV. PARTICLE SIZE, μm | SPEC. SURFACE AREA m²/g | OXYGEN wt. % | CARBON wt. % |
|---|---|---|---|---|---|---|
| Powder From Media Alone | | 2 | 0.79 | 5.1 | | 8.5 |
| Control Example | | | | | | |
| AlN | Water | 0 | 2.66 | 1.5 | 1.6 | |
| | | 4 | 0.88 | 6.3 | 35.7 | |

A comparison of the results in Table II clearly shows that despite the dramatic reductions in particle size and increase in surface area, percent oxygen in oxygen sensitive ceramic materials, ground in accordance with the present invention, increased at less than 20% of the rate of increase in surface area. By comparison, when aluminum nitride was ground in water the oxygen increased at a rate over three times faster than surface area.

It must be recognized that to obtain good sintering results from powders prepared in accordance with the present invention, the powders must be protected from subsequent oxidation, i.e., the powders should not be exposed to air or solvents which can release oxygen to the powder, e.g., water and many alcohols.

What is claimed is:

1. A method for grinding an oxygen sensitive ceramic material to a powder which comprises grinding an oxygen sensitive ceramic feed material selected from the group consisting of AlN, $TiB_2$, $Si_3N_4$, sialons and any other material more oxygen sensitive than boron carbide having an average particle size of between 1 and 200 microns in an contamination free high energy autogenous attrition mill in non-oxidizing fluid in the presence of media, for a sufficient time to obtain a ground material and a specific surface area of at least 5 m²/g, said media consisting essentially of the same ceramic as the feed material and having an average particle size of less than 4 mm.

2. The method of claim 1 wherein the ceramic is selected from the group consisting of AlN, $TiB_2$, $Si_3N_4$ and sialons.

3. The method of claim 2 wherein the fluid is a hydrocarbon liquid.

4. The method of claim 2 wherein the fluid is a mixture of an aliphatic liquid and a gas selected from inert gases, hydrogen and nitrogen.

5. The method of claim 3 wherein the fluid is an aliphatic hydrocarbon.

6. The method of claim 5 wherein the fluid is heptane.

7. The method of claim 2 wherein the fluid is a liquefied cryogenic gas.

8. The method of claim 7 wherein the gas is a cryogenic gas selected from the group consisting of hydrogen, helium, nitrogen, argon and neon.

9. The method of claim 7 wherein the cryogenic gas is hydrogen chloride.

10. The method of claim 1 wherein the ground material is further treated to obtain a powder wherein the average particle size is less than 1 micron and so that greater than 97 numerical percent of the particles of the finished powder is smaller than 5 microns.

11. The method of claim 10 wherein the powder is aluminum nitride.

12. The method of claim 10 wherein the ground material is further treated by vibratory grinding to further grind the larger particles of the material.

13. The method of claim 11 wherein the ground material is further treated by vibratory grinding to further grind the larger particles of the material.

14. The method of claim 13 wherein the vibratory grinding occurs for from 2 to 8 hours in a vibrational mill containing aluminum nitride cylindrical pellets, said pellets having a maximum dimension of from about 0.5 to 5 centimeters and wherein the diameter of the cylinder is from 0.3 to 4 times the length of the cylinder.

15. The method of claim 10 wherein the ground material is further treated by sedimentation from a liquid to remove larger size particles.

16. The method of claim 10 wherein the finished powder has an average particle size of from 0.5 to 0.9 microns.

17. The method of claim 1 wherein the internal surface of the mill and agitator within the mill are coated with an abrasion resistant material selected from polyurethane, natural rubber and synthetic rubber.

18. The method of claim 1 wherein the liquid is heptane, and the slurry contains from about 30 to about 70 weight percent solids.

19. The method of claim 1 wherein the grinding occurs for from 2 to 10 hours.

20. The method of claim 1 wherein heat developed during grinding is removed by circulating the slurry through a heat exchanger.

21. The method of claim 17 wherein the tip speed of the agitator is above 7.5 meters per second.

22. The method of claim 1 wherein the feed material contains less than 800 ppm metal impurities.

23. Finished powder manufactured in accordance with the method of claim 1.

24. Finished powder manufactured in accordance with the method of claim 2.

25. Finished powder manufactured in accordance with the method of claim 3.

26. Finished powder manufactured in accordance with the method of claim 4.

27. Finished powder manufactured in accordance with the method of claim 5.

28. Finished powder manufactured in accordance with the method of claim 6.

29. Finished powder manufactured in accordance with the method of claim 7.

30. Finished powder manufactured in accordance with the method of claim 8.

31. Finished powder manufactured in accordance with the method of claim 9.

32. Finished powder manufactured in accordance with the method of claim 10.

33. Finished powder manufactured in accordance with the method of claim 11.

34. Finished powder manufactured in accordance with the method of claim 12.

35. Finished powder manufactured in accordance with the method of claim 13.
36. Finished powder manufactured in accordance with the method of claim 14.
37. Finished powder manufactured in accordance with the method of claim 15.
38. Finished powder manufactured in accordance with the method of claim 16.
39. Finished powder manufactured in accordance with the method of claim 17.
40. Finished powder manufactured in accordance with the method of claim 18.
41. Finished powder manufactured in accordance with the method of claim 19.
42. Finished powder manufactured in accordance with the method of claim 20.
43. Finished powder manufactured in accordance with the method of claim 21.
44. Finished powder manufactured in accordance with the method of claim 22.
45. An oxygen sensitive ceramic powder selected from the group consisting of AlN, $TiB_2$, $Si_3N_4$, sialons and any other material more oxygen sensitive than boron carbide having an average particle size smaller than 1 micron, greater than 97 numerical percent of the particles being smaller than 5 microns, a surface area greater than 9 $m^2/g$, said powder being low in surface oxygen and being sinterable.
46. The powder of claim 45 wherein the finished powder is at least as pure as the feed material used to make the powder.
47. The powder of claim 31 wherein the finished powder contains less than 800 ppm metal impurities.
48. The powder of claim 47 wherein the powder contains less than 10 ppm boron and less than 100 ppm aluminum.
49. The powder of claim 45 wherein the powder contains less than 6 weight percent oxygen.
50. The powder of claim 45 wherein the powder contains less than 5 weight percent oxygen.
51. The powder of claim 45 wherein the powder contains less than 3 weight percent oxygen.

* * * * *